United States Patent [19]
Brown et al.

[11] Patent Number: 5,879,163
[45] Date of Patent: Mar. 9, 1999

[54] ON-LINE HEALTH EDUCATION AND FEEDBACK SYSTEM USING MOTIVATIONAL DRIVER PROFILE CODING AND AUTOMATED CONTENT FULFILLMENT

[75] Inventors: Stephen J. Brown, Mountain View, Calif.; Erik K. Jensen, Stockton, N.J.

[73] Assignee: Health Hero Network, Inc., Mountain View, Calif.

[21] Appl. No.: 669,613

[22] Filed: Jun. 24, 1996

[51] Int. Cl.⁶ ............ G09B 19/00; G09B 23/28; G09B 7/00
[52] U.S. Cl. ............ 434/236; 434/262; 434/323; 434/362
[58] Field of Search .................... 434/236, 237, 434/262, 307 R, 322, 323, 350, 353, 362

[56] References Cited

U.S. PATENT DOCUMENTS

| | | | |
|---|---|---|---|
| 4,428,733 | 1/1984 | Kumar-Misir | 434/363 |
| 5,025,374 | 6/1991 | Roizen et al. | 364/413.02 |
| 5,542,420 | 8/1996 | Goldman et al. | 128/630 |
| 5,572,421 | 11/1996 | Altman et al. | 395/203 |
| 5,596,994 | 1/1997 | Bro | 128/732 |
| 5,692,906 | 12/1997 | Corder | 434/156 |

FOREIGN PATENT DOCUMENTS

407095963 A   4/1995   Japan .

*Primary Examiner*—Robert A. Hafer
*Assistant Examiner*—John Edmund Rovnak
*Attorney, Agent, or Firm*—Lumen Intellectual Property Services

[57] ABSTRACT

An automated system and method provides customized health education to an individual at a remote terminal to induce a modification in a health-related behavior of the individual. The automated system includes a questionnaire generator for questioning the individual to determine his or her motivational drivers and comprehension capacity. A profile generator receives answers entered by the individual from the remote terminal and generates a motivational driver profile and a comprehension capacity profile of the individual. A translator receives clinical data relating to a current health condition of the individual and translates the clinical data, the motivational driver profile, and the comprehension capacity profile into a profile code. An educational fulfillment bank matches the profile code to matching educational materials and transfers the matched educational materials to the remote terminal. An evaluation program evaluates educational responses of the individual and provides profile updates for targeting subsequent educational material to the individual based on the educational responses.

20 Claims, 8 Drawing Sheets

INTERVIEW FORM — 46

CURRENT HEALTH CONDITION — 54
- 56 — CURRENT DISEASES OR SYMPTOMS?
- 58 — PATTERN AND HISTORY DATA?

MOTIVATIONAL DRIVERS — 60
- 62 — LONGEVITY?
- 64 — QUALITY OF LIFE?
- 66 — FAMILY LIFE?
- 68 — SOCIAL ACCEPTABILITY?
- 70 — SOCIAL RESPONSIBILITY?
- 72 — ECONOMY?

COMPREHENSION CAPACITY — 74
- 76 — AGE?
- 78 — LANGUAGE SKILLS?
- 80 — READING HABITS?
- 82 — EDUCATIONAL BACKROUND?

PREFERRED MEDIA — 84
- 86 — PICTURES?
- 88 — TEXT?
- 90 — VIDEO GAMES?

*FIG. 3*

ON-LINE HEALTH EDUCATION AND FEEDBACK SYSTEM USING MOTIVATIONAL DRIVER PROFILE CODING AND AUTOMATED CONTENT FULFILLMENT

BACKGROUND—FIELD OF THE INVENTION

The present invention relates to the field of on-line health education, and in particular to an automated system and method for providing customized health education to induce a modification in a health related behavior of an individual.

BACKGROUND—DESCRIPTION OF PRIOR ART

The goal of most health education programs is to motivate individuals to modify their health-related behaviors to improve their current state of health or to reduce their health-related risks. In its simplest form, a health education program exposes an individual to information or instructions relating to a selected health behavior. The individual then may modify his or her behavior to accommodate the information and adhere to the instructions. The degree to which the individual modifies his or her health-related behavior and adheres to the instructions defines the individual's compliance to the health education program.

In a health educational program in which adherence to the instructions would clearly benefit the health of the individual, one would expect a high degree of compliance. Unfortunately, this is rarely the case. As an example, healthcare providers, health-care payers, and government agencies have launched massive media campaigns to expose nearly the entire U.S. population to health information regarding the damaging effects of smoking cigarettes. The instructions to quit smoking and the health benefits obtainable by quitting are explicit. Nevertheless, a disappointingly small percentage of the target population responds to the anti-smoking campaign by attempting to quit smoking.

One such anti-smoking campaign involves mailing a multiple page pamphlet to every household within a geographical region. The pamphlet is written in English and gives a detailed description of five medical conditions resulting from smoking: Emphysema, Pulmonary Carcinoma, Atherosclerosis, and Cerebral Hemorrhage. The pamphlet also informs the reader that by quitting smoking, he or she will experience a sixty percent reduction in the risk of contracting any of these ailments, a reduction that translates into a significant gain in life expectancy.

Although this mass mailing method of health education sets forth explicit instructions and states compelling health reasons to follow the instructions, it has several disadvantages that prevent it from succeeding. First, the method fails to consider the comprehension capacity of the pamphlet's audience. For example, because the pamphlet is written in English, it may exclude roughly twenty-five percent of the population in the selected geographical region who read only Spanish.

Further, the pamphlet describes the consequences of smoking using medical terminology like Emphysema, Pulmonary Carcinoma, etc. Twenty-five percent of the population in the selected region without a high school degree might prefer plain language, such as Stiff Lungs, Lung Cancer, Hardened Blood Vessels, and Stroke. The pamphlet quickly loses the attention of these recipients as well. As a result of its failure to consider the comprehension capacity of each individual recipient, the mass mailing method loses roughly half of the target population it intends to educate due to standardized language, standardized delivery, and standardized media.

The mass mailing method of health education has a second disadvantage in failing to consider the evaluation and judgment of each individual receiving a pamphlet. Upon receiving the pamphlet, each individual will immediately decide if the topic discussed is relevant to his or her situation. Because the pamphlet is mailed to all households within a region, money is wasted by mailing the pamphlet to disinterested non-smokers. Additionally, the opening and reading of the anti-smoking pamphlet is tedious for the non-smokers. As a result, they might not even bother to open and read a subsequent pamphlet addressing a health topic relevant to their health condition.

A third disadvantage of the mass mailing method is its inability to target specific motivating factors for behavior modification to each individual receiving a pamphlet. For example, the pamphlet addresses longevity of life associated with quitting smoking, but many individuals receiving the pamphlet may value the present far more than the future. Because the pamphlet does not address present day issues, such as coughing at night while trying to sleep or spending fifteen hundred dollars per year on cigarettes, the individual living for the present will not be motivated to quit smoking. Each individual has his or her own motivational drivers for inducing behavior modification that cannot be specifically targeted in a standardized pamphlet.

A fourth disadvantage of the mass mailing method of health education is its inability to provide feedback and continued motivation to each individual recipient. Even if one individual did actually quit smoking as a result of reading the pamphlet, the individual would receive no specialized follow-up education for coping with nicotine withdrawal, weight gain, or other consequences of this behavioral change. Of course, mass mailing is just one example of a standardized broadcast media technique. The same disadvantages as those described for mass mailings hold for other broadcast media methods of health education.

A completely customized educational solution for modifying health related behaviors can be accomplished using a private or semi-private educational environment. Within such an environment, it is possible to psychologically analyze each individual to identify his or her specific motivational drivers for making health-related decisions or modifying health-related behavior. The disadvantage of this private method is that it is too expensive and time consuming for a large percentage of the population to afford. As a result, it excludes this large percentage of the population who could significantly benefit from customized health education.

Due to the disadvantages of private analysis and education, attempts have been made to implement computer-automated health education systems that are available to the general public. For example, U.S. Pat. No. 4,464,122 issued to Fuller et al. on Aug. 7, 1984 discloses a health potential summary and incentive system. The system reads and scores the answers to a printed questionnaire completed by an individual. The questionnaire includes questions to determine the individual's demographics, alcohol and tobacco usage, stress factors, exercise routines, and daily nutrition. Based on the individual's scored answers, the system prints a summary analysis of the individual's health condition in several health categories, as well as recommendations for improvement in each category.

A similar system is disclosed in U.S. Pat. No. 5,084,819 issued to Dewey et al. on Jan. 28, 1992. Dewey describes an expert data collection, analysis, and response system for reading and scoring a questionnaire form completed by. an individual. The questionnaire includes questions to determine the individual's current health condition, such as his or her blood pressure, as well as the individual's alcohol and tobacco usage. The system prints for the individual specific recommendations based on the scored answers.

The systems described by Fuller and Dewey have many of the same disadvantages as those described for the mass mailing method of health education and behavior modification. First, they only determine from a questionnaire what an individual's health-related behavior is. They fail to determine the specific motivational drivers each individual may have for changing the health related behavior. As a result, they give each individual very little personal incentive to make a significant behavioral change. Second, these systems described by Dewey and Fuller do not customize their printed summaries to conform to a specific comprehension capacity or media selection of the individual user. Consequently, they may exclude portions of the population who cannot fully understand or appreciate the printed recommendations. Third, these systems have no mechanism for continued feedback and support, so that even if an individual did temporarily comply with the recommendations, the individual would soon lose motivation to continue with his or her change in behavior.

A system that attempts to overcome the problems associated with lack of continued motivational support is described in U.S. Pat. No. 5,207,580 issued to Strecher on May 4, 1993. Strecher discloses a tailored health-related behavioral change and adherence system. In this system, an individual's answers to health-related questions are used to select instructional and motivational statements for changing a behavior of the individual. The instructional and motivational statements are then placed on dated pages, such as those of a calendar, corresponding to dates before, during, and after a selected change date for the health-related behavior.

Although this calendar system described by Strecher does provide continued support to an individual attempting to modify his or her behavior, the continued support is not based on any performance feedback from the individual. Because the calendar is printed in advance on the basis of one questionnaire, the system has no mechanism for adjusting the educational and motivational material supplied to the individual in dependence upon new data relating to the individual's mental and physical health condition. Further, the Strecher system has no mechanism for tailoring the educational and motivational instructions to the specific comprehension capacity and preferred media of the individual user.

Another system for providing positive motivational statements to an individual to effect a behavioral change is disclosed in U.S. Pat. No. 5,377,258 issued to Bro on Dec. 27, 1994. Bro describes an automated and interactive system that allows a doctor or trainer to produce and send a series of motivational messages and instructions to a client to motivate or reinforce a change in a specific behavioral problem.

The system includes a client database for storing for each client a name, a calling schedule, and a personal identification number. The system further includes a client program that contains for each client motivational messages and questions for the client to answer. The system optionally includes an electronic weight scale, olfactory unit, or voice stress analyzer to collect additional data from the client. The client database and client program are operated by a computer that at preselected times sends the motivational messages or questions to the clients dual tone multifrequency telephone after the client has successfully transmitted to the computer a valid personal identification number.

Although this system disclosed by Bro does provide continued feedback and motivational support to an individual, it suffers from two of the same disadvantages described earlier for the Fuller and Dewey systems. First, Bro does not teach the profiling of an individual to determine his or her specific motivational drivers for changing a health-related behavior. Consequently, the motivational support provided by the system may be ineffective for many of the individual clients. Secondly, the system has no mechanism for tailoring the motivational messages to the specific comprehension capacity and preferred media of an individual client. The system is only designed to play motivational messages or collect answers to questions using a telephone.

Thus, none of the prior automated systems for providing health education to the general public effectively customize the educational material to correspond to the specific motivational drivers of each individual user. Further, none of the prior automated systems have a mechanism for customizing the educational material to conform to the comprehension capacity and preferred media of the individual user. Additionally, several of the systems lack any feedback mechanism for receiving evaluation data regarding the individual's performance in modifying his or her behavior and for providing the individual continued customized support for the behavioral change.

OBJECTS AND ADVANTAGES OF THE INVENTION

In view of the above, it is an object of the present invention to provide an automated system and method for customized health education that successfully induces a modification in a health-related behavior of an individual. It is another object of the invention to provide an automated system and method for health education that targets educational material to the specific motivational drivers, comprehension capacity, and preferred media of the individual. A further object of the invention is to provide a system and method for health education that allows adjustment of the educational material based on the individual's performance in modifying his or her behavior.

These and other objects and advantages will become more apparent after consideration of the ensuing description and the accompanying drawings.

SUMMARY OF THE INVENTION

The invention presents an automated system and method for providing customized health education to an individual at a remote terminal to induce a modification in a health-related behavior of the individual. The automated system is connected to the remote terminal via a communication network, such as a public communication network. The system includes a questionnaire generator for generating an interview form and for transferring the interview form through the communication network to the remote terminal. The interview form contains questions for determining a motivational driver, a comprehension capacity, and a preferred media of the individual.

The system also includes a profile generator for receiving through the communication network questionnaire answers entered by the individual from the remote terminal and for generating from the questionnaire answers a motivational driver profile, a comprehension capacity profile, and a media selection profile of the individual. A translator is connected to the profile generator and the communication network for receiving through the communication network clinical data relating to a current health condition of the individual and for translating the clinical data, the motivational driver profile, the comprehension capacity profile, and the media selection profile into a profile code of the individual.

An educational fulfillment bank is connected to the translator and the communication network. The educational fulfillment bank is for storing pieces of education material for inducing the modification of the health-related behavior, each piece of educational material having an index code, and for transferring through the communication network to the remote terminal at least one piece of educational material having an index code matching the profile code of the individual.

In the preferred embodiment, the system also includes an evaluation program connected to the profile generator for evaluating educational responses of the individual to the educational material and for providing profile updates derived from the educational responses. In this manner, the progress of the individual attempting to modify his or her behavior is continuously monitored, and the system adjusts the targeting of the educational material based on the individual's performance in modifying his or her behavior.

BRIEF DESCRIPTION OF THE DRAWINGS

FIG. 3 is a schematic view of an interview form appearing on the screen of the remote terminal of FIG. 1.

DESCRIPTION

Figure 1:
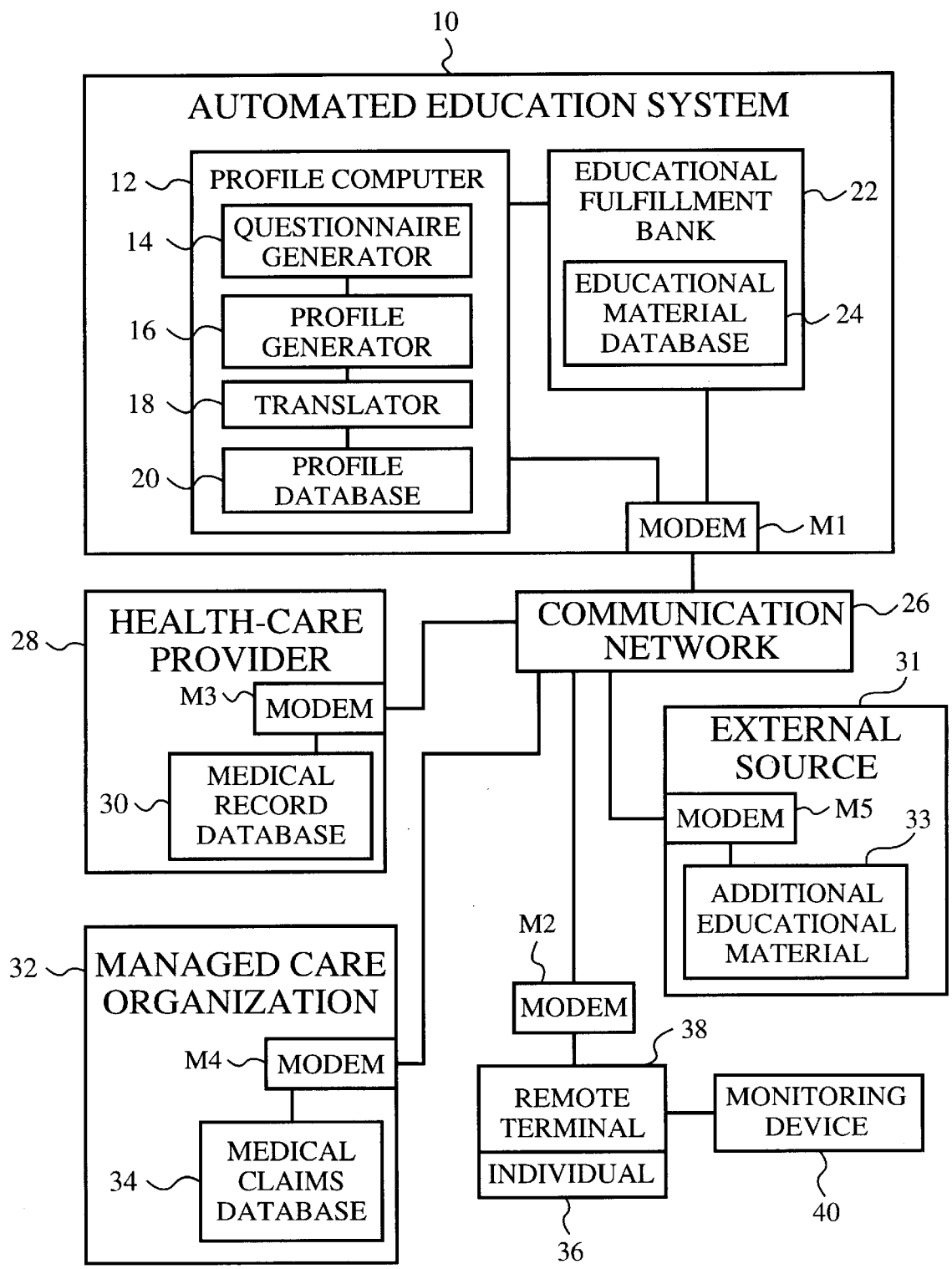
FIG. 1 is a schematic block diagram illustrating the main components of an automated education system and its connections to an individual at a remote terminal according to the invention.

The preferred embodiment of the invention is illustrated in FIGS. 1–8. Referring to FIG. 1, an automated education system 10 includes a profile computer 12 having a questionnaire generator 14, a profile generator 16, a translator 18, and a profile database 20. Profile computer 12 is connected to an educational fulfillment bank 22 having an educational material database 24. Educational material database 24 is for storing pieces of educational material for inducing a modification in a health-related behavior of an individual. Profile computer 12 and educational fulfillment bank 22 are networked to a modem M1 for connecting profile computer 12 and educational fulfillment bank 22 to a communication network 26.

An individual 36 desiring access to system 10 is located at remote terminal 38. Remote terminal 38 is connected to communication network 26 through a modem M2 such that remote terminal 38 accesses system 10 for interactive education sessions through modem M2 and communication network 26. For simplicity, only one remote terminal 38 is illustrated in FIG. 1. It is obvious that many more remote terminals can be connected to communication network 26 for accessing system 10.

A monitoring device 40 for monitoring a health condition of individual 36 is connected to remote terminal 38. Monitoring device 40 is capable of producing measurements of a physical characteristic of the health condition and of uploading the measurements to remote terminal 38 for transmission to system 10. In one possible embodiment, individual 36 is a diabetic and monitoring device 40 is a blood glucose meter for measuring blood glucose levels of individual 36. In another embodiment, individual 36 is asthmatic and monitoring device 40 is a peak flow meter for measuring the individual's peak flow levels. Specific techniques for connecting a monitoring device to a remote terminal for remote monitoring of an individual's health condition are well known in the art.

Communication network 26 further connects a health-care provider 28 of individual 36 to profile computer 12. Provider 28 has a medical record database 30 for storing electronic medical records of individual 36. Medical record database 30 is connected to communication network 26 through a modem M3 such that profile computer 12 receives through network 26 the stored electronic medical records from database 30. Similarly, communication network 26 connects a managed care organization 32 of individual 36 to profile computer 12. Organization 32 has a medical claims database 34 for storing medical claims data of individual 36. Medical claims database 34 is connected to communication network 26 through a modem M4 such that profile computer 12 receives through network 26 the stored medical claims data from database 34.

Communication network 26 also connects education fulfillment bank 22 to an external educational source 31 having an additional educational material database 33. Database 33 is for storing additional educational materials for inducing a modification in the behavior of individual 36. Database 33 is connected to communication network 26 through a modem M5 such that educational fulfillment bank 22 may transfer additional educational materials from database 33 to remote terminal 38 through network 26.

In the preferred embodiment, communication network 26 is a public communication network, such as the Internet or public telephone network, and system 10, remote terminal 36, health-care provider 28, managed care organization 32, and external source 31 connect to the public communication network through the use of modems, as illustrated in FIG. 1. Of course, many other types of communication networks and connections to the communication networks may be employed without departing from the scope of the invention. Specific techniques for networking computer systems for on-line interaction are well known in the art.

Figure 2:
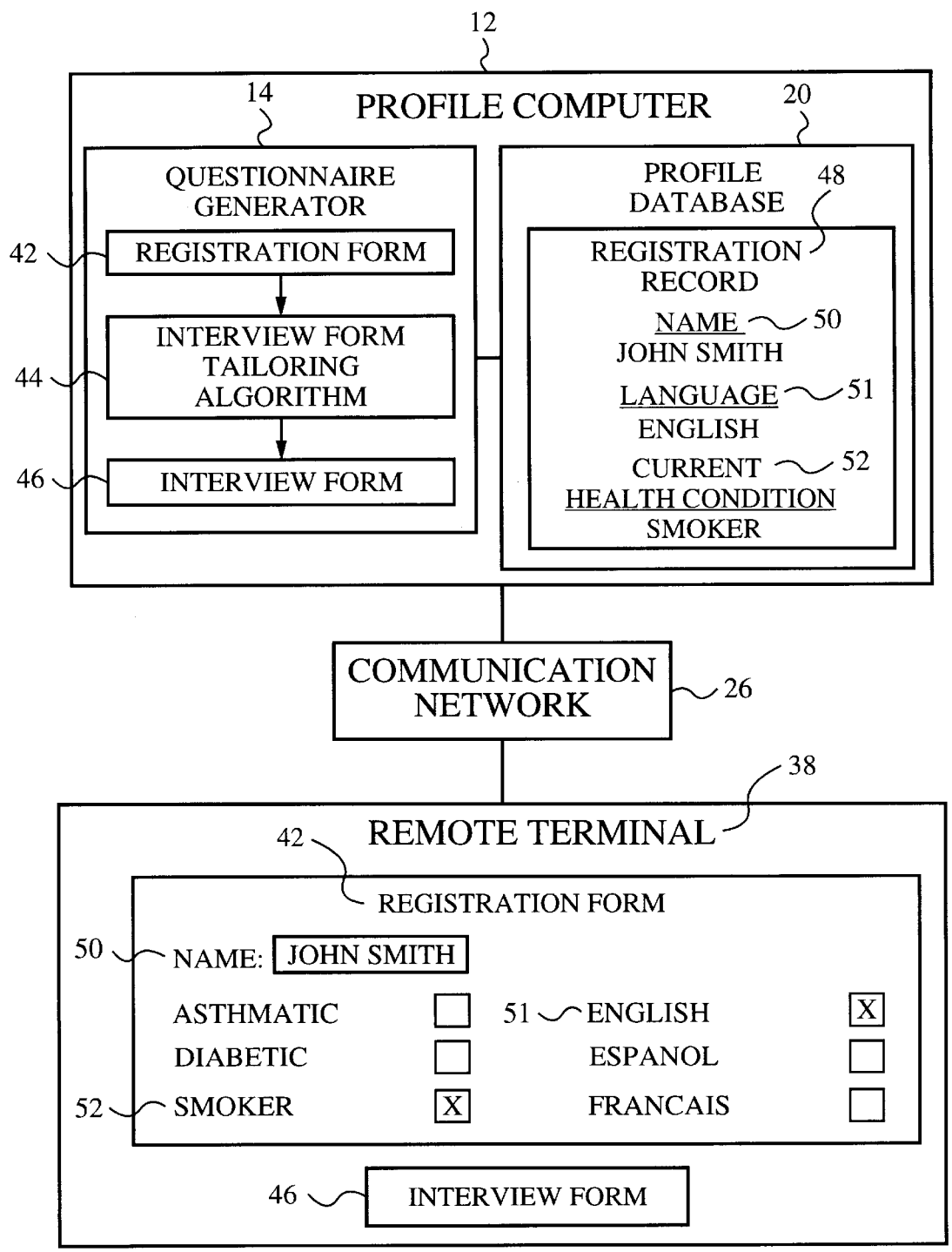
FIG. 2 is a schematic block diagram illustrating the generation of an interview form according to the method of the invention.

Referring to FIG. 2, questionnaire generator 14 is capable of generating an interactive interview form 46 and of transferring interview form 46 through communication network 26 to the screen of remote terminal 38. In the preferred embodiment, questionnaire generator 14 also includes a registration program for generating a registration form 42 and for transferring registration form 42 through communication network 26 to remote terminal 38. Registration form 42 includes data fields for a name 50, a language 51, and a current health condition 52 of individual 36. Profile database 20 has storage capability for storing a registration record 48 that includes name 50, language 51, and current health condition 52 of individual 36.

In a typical implementation, questionnaire generator 14 stores hundreds of questions in various languages relating to possible health conditions of individual 36, such as asthma, diabetes, nicotine addiction, etc. To narrow the focus of interview form 46, questionnaire generator 14 further includes an interview form tailoring algorithm 44 for tailoring interview form 46 in dependence upon language 51 and current health condition 52 of individual 36. For example, in FIG. 2, individual 36 has indicated his language as "ENGLISH" and current health condition as "SMOKER" so that tailoring algorithm 44 tailors interview form 46 to contain English language questions pertaining to smoking and smoking related behaviors of individual 36.

Interview form 46 is illustrated in greater detail in FIG. 3. Interview form 46 contains a first category of questions 54 relating to the current health condition of individual 36. Category 54 is divided into a first subset of questions 56 for determining current diseases or symptoms of individual 36 and a second subset of questions 58 for determining the pattern and history data of the individual's health condition. In the example of the preferred embodiment in which individual 36 is a smoker, subset 56 asks about any current diseases or symptoms smoking has caused in individual 36. Similarly, subset 58 asks for the pattern and history data of the individual's smoking habit.

Interview form 46 further includes a second category of questions 60 for determining a motivational driver of individual 36. Category 60 is divided into six subsets of questions 62, 64, 66, 68, 70, and 72 for determining a value placed by individual 36 on various motivating factors for modifying his or her behavior. Subset 62 is for determining the value placed by individual 36 on longevity. For example, if individual 36 is a smoker, subset 62 includes questions to determine if the prospect of living a long life would provide sufficient motivation to quit smoking.

Subset 64 is for determining the value placed by individual 36 on the quality of his or her life. In the smoking example, subset 64 includes questions to determine if an improvement in smoking symptoms, such as no longer suffering coughing fits, would provide sufficient motivation to quit smoking. Subset 66 is for determining the value placed by individual 36 on family life. In the smoking example, subset 66 includes questions to determine if an improvement in family life, such as no longer harming relatives with second hand smoke, would provide sufficient motivation to stop smoking. Subset 68 is for determining the value placed by individual 36 on social acceptability. In the smoking example, subset 68 includes questions to determine if an improvement in social acceptability, such as no longer offending people with bad breath, would provide sufficient motivation to quit smoking.

Subset 70 is for determining the value placed by individual 36 on social responsibility. In the smoking example, subset 70 includes questions to determine if an improvement in social responsibility, such as not burdening society with the cost of Emphysema treatment, would positively motivate individual 36 to quit smoking. Subset 72 is for determining the value placed by individual 36 on economy. In the smoking example, subset 72 includes questions to determine if the cost savings associated with no longer purchasing cigarettes would provide sufficient motivation to quit smoking.

Interview form 46 also includes a third category of questions 74 for determining a comprehension capacity of individual 36. Category 74 is divided into four subsets of questions 76, 78, 80, and 82 for determining various comprehension capacity factors. Subset 76 is for determining an age of individual 76 and subset 78 is for determining language skills of individual 36. Similarly, subset 80 is for determining reading habits of individual 76 and subset 82 is for determining an educational background of individual 36.

A fourth category of questions 84 is for determining a media preference of individual 84. Category 84 is divided into three subsets of questions 86, 88, and 90 for determining if individual 36 prefers pictures, text, or video games, respectively. Of course, these types of media are just examples of possible media choices. Interview form 46 and educational fulfillment bank 22 may offer other media choices in alternative embodiments, such as computer videos, musical lyrics, or hyper-text links.

Figure 4:
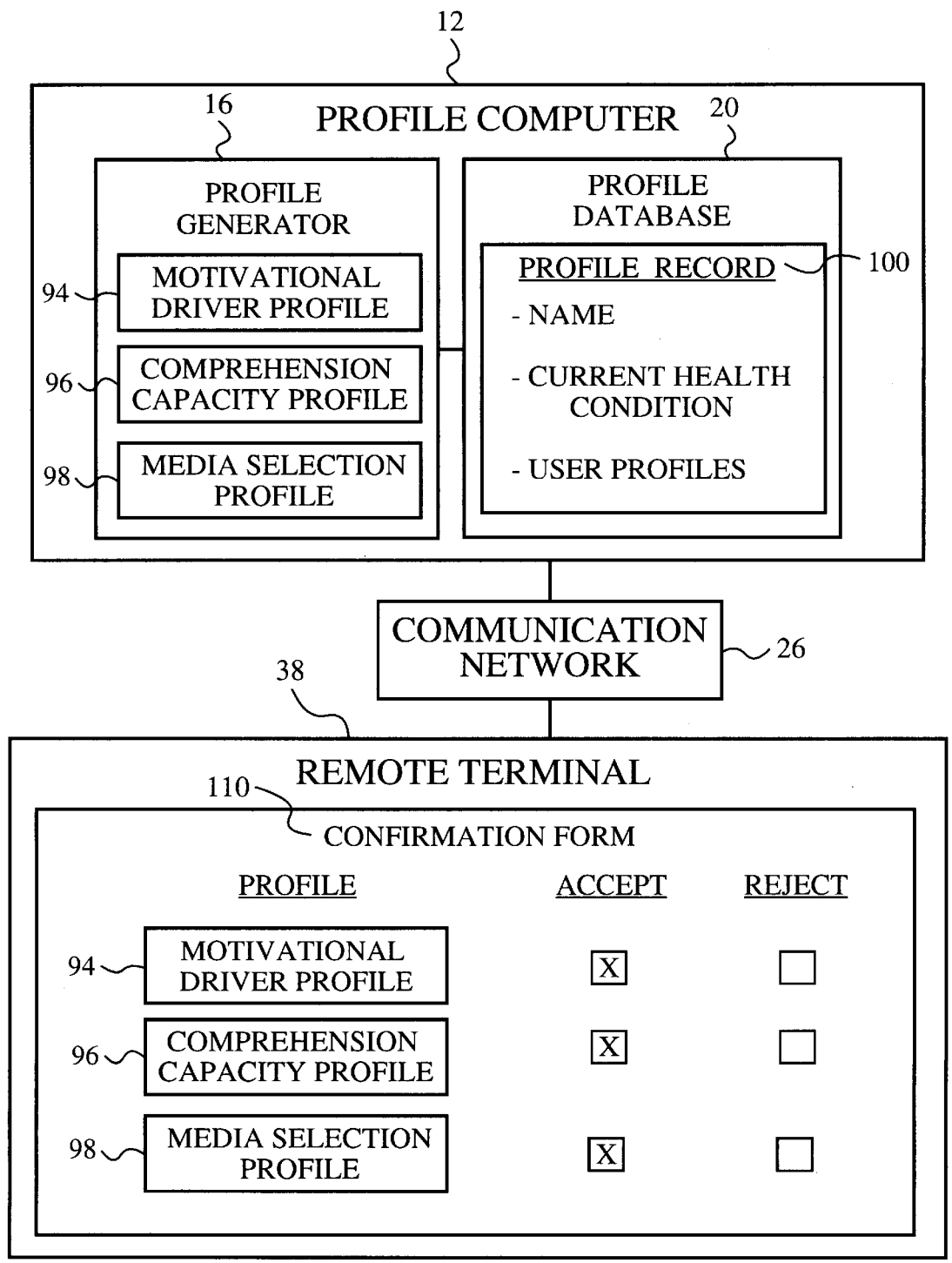
FIG. 4 is a schematic block diagram illustrating the confirmation of generated profiles according to the method of the invention.

Referring to FIG. 4, profile generator 16 is designed to generate a motivational driver profile 94, a comprehension capacity profile 96, and a media selection profile 98 from the questionnaire answers, as will be explained in the operation section below. Profile generator 16 further includes a confirmation program for sending a confirmation form 110 to remote terminal 38. Confirmation form 110 includes a summary of each generated profile 94, 96, and 98 so that individual 36 may confirm each of the generated profiles. Profile database 20 is designed to store a profile record 100 of individual 36 that includes his or her name, current health condition, and confirmed profiles.

Figure 5:
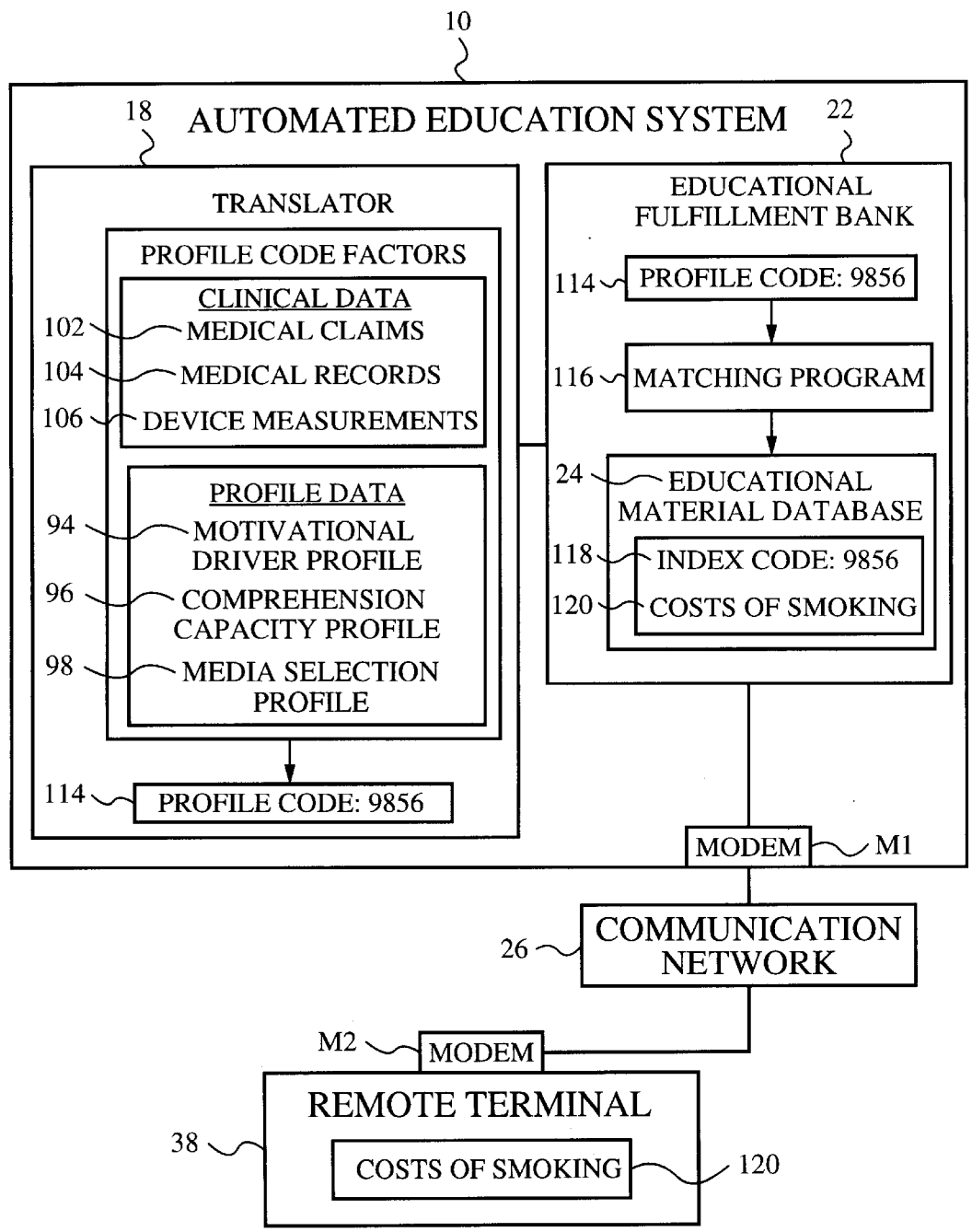
FIG. 5 is a schematic block diagram illustrating the creation of a profile code and the transferring of educational materials matching the profile code according to the method of the invention.

Referring to FIG. 5, translator 18 is designed to translate clinical data received through network 26 and profiles 94, 96, and 98 received from profile generator 16 into a profile code 114, as will be explained in the operation section below. Profile code 114 is for targeting specific educational material to individual 36 based on each profile 94, 96, and 98 as well as the individual's clinical data. In the preferred embodiment, the clinical data includes medical claims data 102 received from claims database 34, electronic medical records 104 received from medical record database 30, and device measurements 106 received from monitoring device 40.

Educational fulfillment bank 22 includes a matching program 116 for matching profile code 114 to an index code 118 of a piece of educational material 120. In a typical implementation, educational material database 24 stores thousands of pieces of educational material, each having an index code, and matching program 116 is a database query program for retrieving from database 24 each piece of educational material having an index code that matches profile code 114. Of course, the pieces of educational material stored in database 24 are index coded such that each matched piece has an educational content specifically targeted to individual 36 based on his or her profile code 114. Matching program 116 is also capable of determining if additional educational materials appropriate for profile code 114 should be transferred to terminal 38 from additional educational material database 33.

In the example of the preferred embodiment, in which individual 36 is asked on interview form 46 if he or she prefers text, pictures, or video games, piece of educational material 120 will be a text document, series of graphical pictures, or educational video game depending on the media selected by individual 36. Of course, other types of media selections, including mixed media selections, are possible in alternative embodiments.

Figure 6:
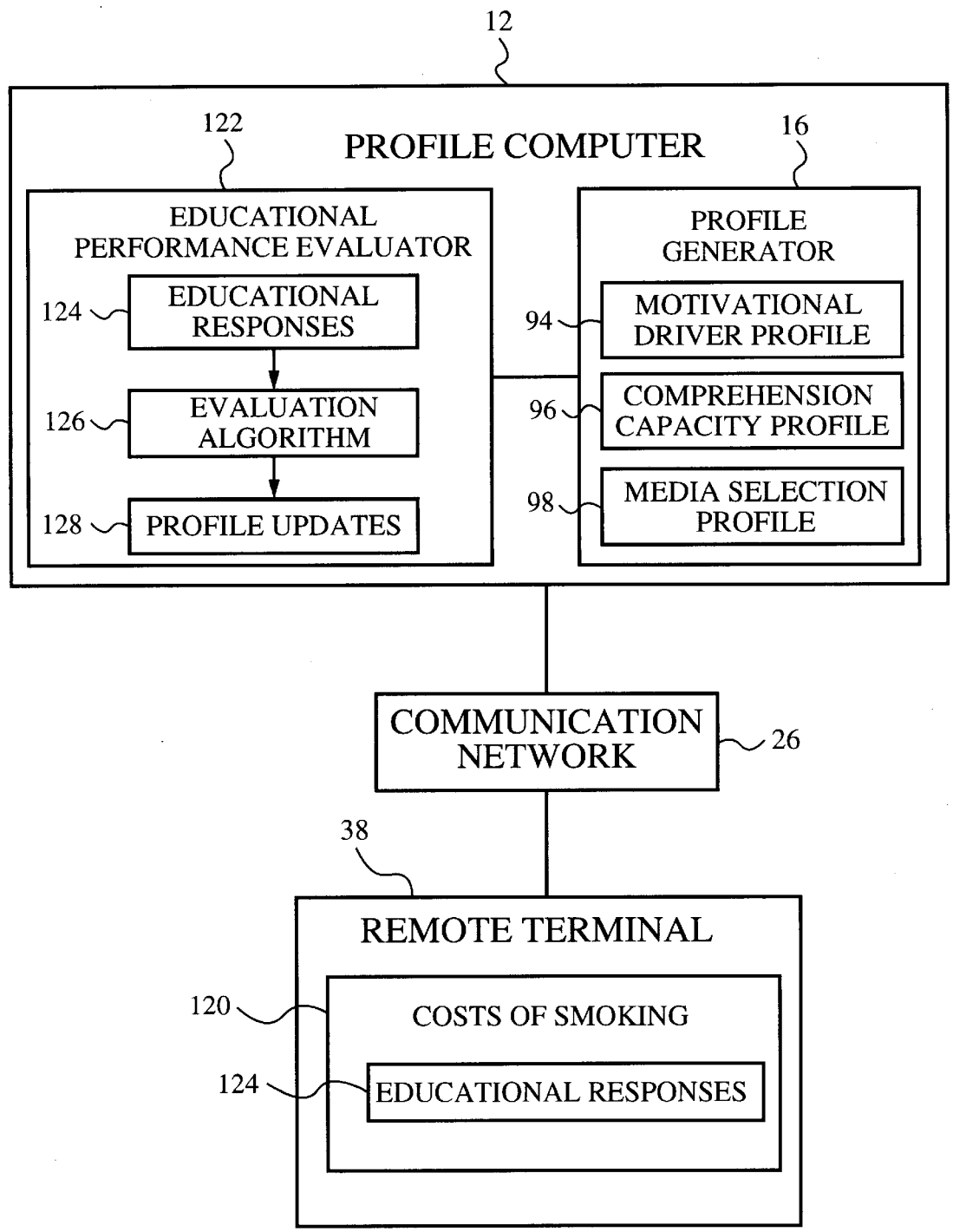
FIG. 6 is a schematic block diagram illustrating the adjustment of individual profiles according to the method of the invention.

Referring to FIG. 6, piece of educational material 120 is designed to allow educational interaction between individual 36 and system 10. For example, if the selected educational material is a text document or series of pictures, the text or pictures also include questions or prompts requiring educational responses 124 from individual 36. If the selected educational material is an educational video game, individual 36 provides educational responses 124 by playing the educational video game on terminal 38.

Profile computer 12 includes an educational performance evaluator 122 for interactively monitoring educational responses 124. Evaluator 122 includes an evaluation algorithm 126 for evaluating educational responses 124 and for generating profile updates 128 derived from educational responses 124. Evaluator 122 is connected to profile generator 16 such that generator 16 receives profile updates 128 and adjust profiles 94, 96, and 98 in accordance with profile updates 128.

Figure 7:
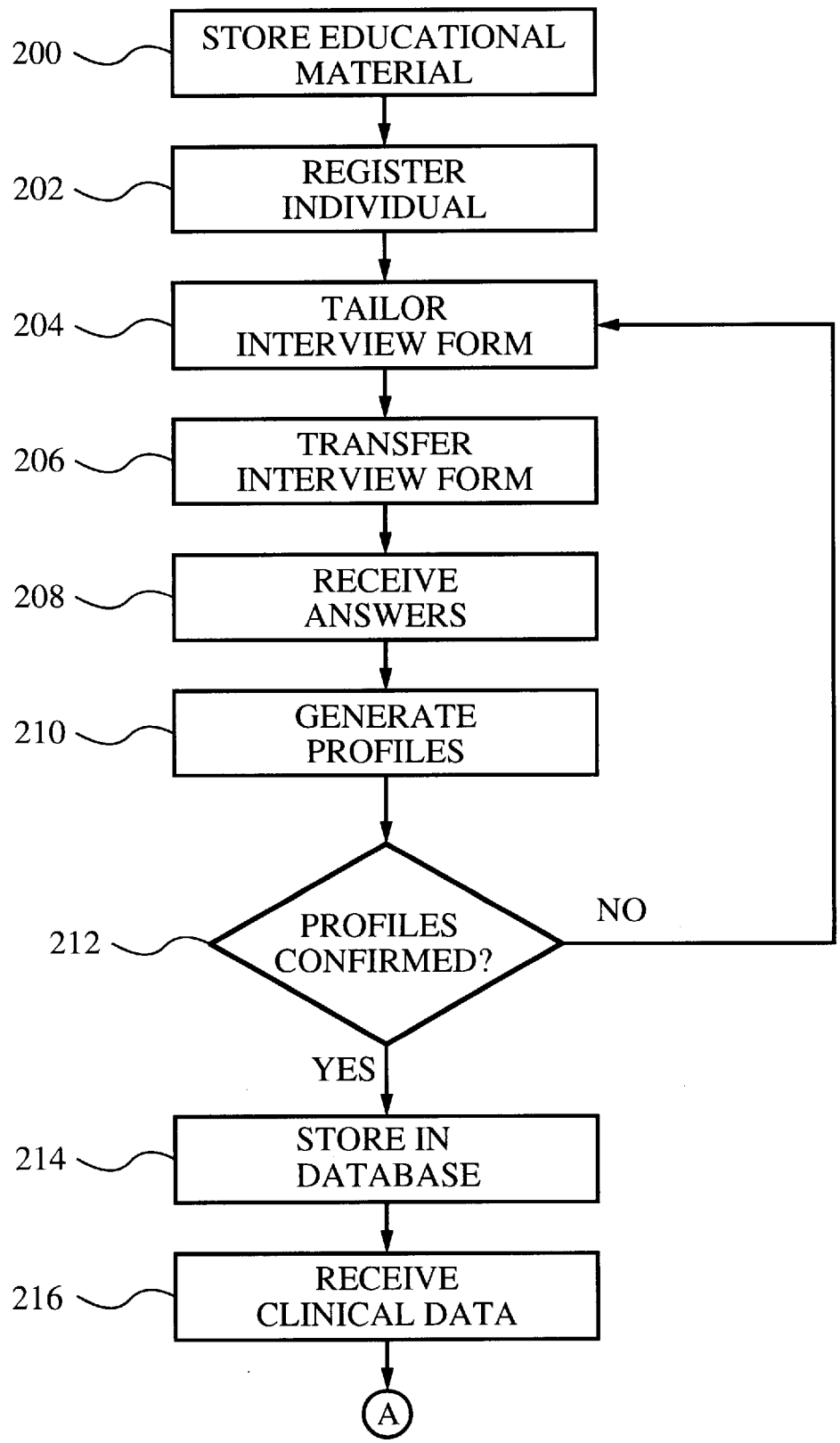
FIG. 7 is a flow chart illustrating steps included in the method of the invention.
Figure 8:
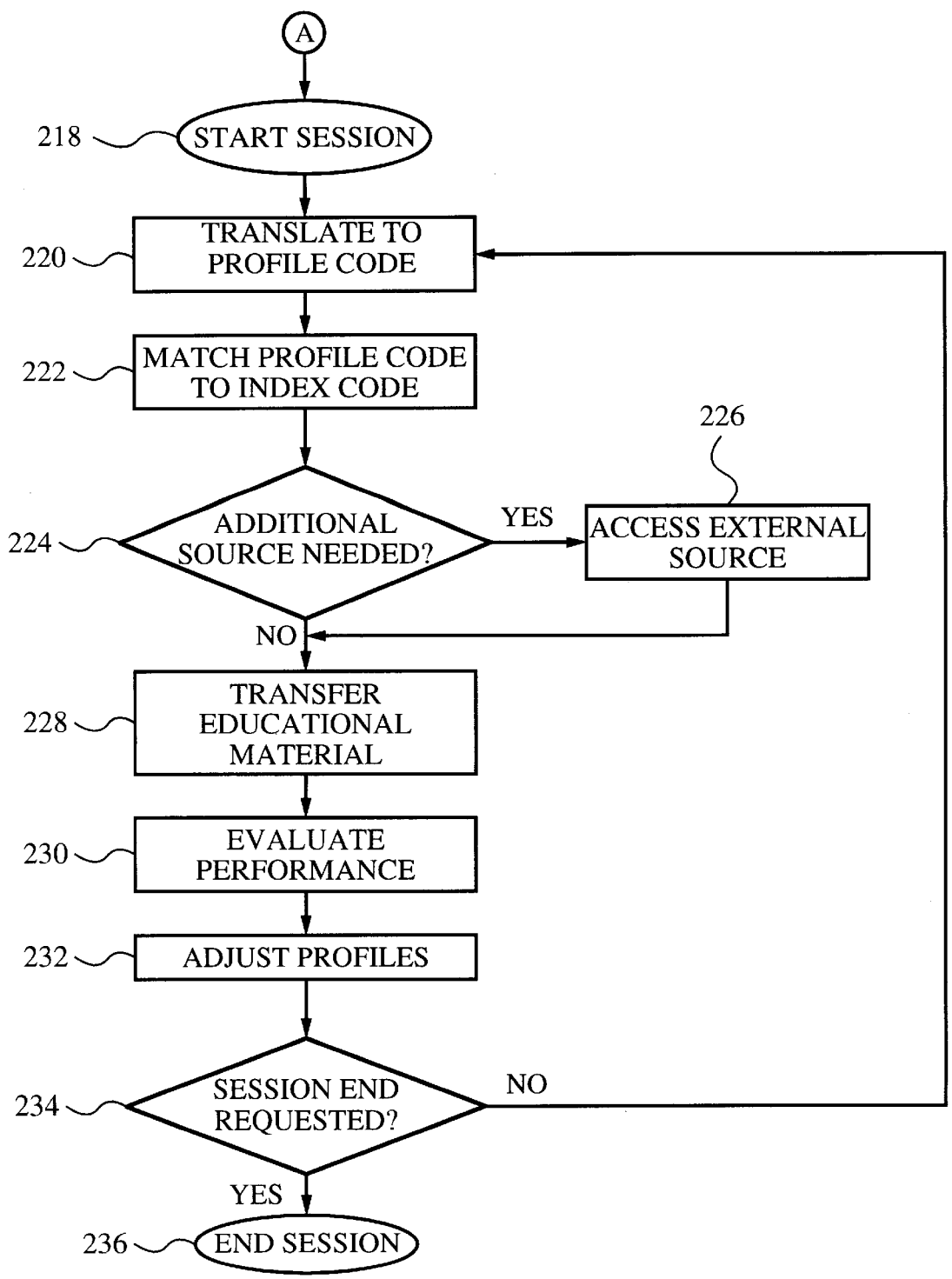
FIG. 8 is a continuation of the flow chart of FIG. 7.

The operation of the preferred embodiment is illustrated in FIGS. 7–8. FIG. 7 is a flow chart showing a preferred method by which system 10 provides customized health education to individual 36 to induce a modification in a health-related behavior of individual 36. In step 200, the pieces of educational material for inducing the behavior modification of individual 36 are stored in educational material database 24. Each piece of educational material is stored with an index code for designating its educational content.

In step 202, individual 36 is registered in profile computer 12. Referring to FIG. 2, individual 36 accesses profile computer 12 through remote terminal 38 and network 26. Next, questionnaire generator 14 transfers registration form 42 to remote terminal 38. Individual 36 enters his or her name 50, language 51, and current health condition 52 into the appropriate fields in registration form 42 and transfers the completed form 42 to profile computer 12. Profile computer 12 stores name 50, language 51, and current health condition 52 as registration record 48 in profile database 20.

Next, in step 204, interview form tailoring algorithm 44 tailors interview form 46 in dependence upon language 51 and current health condition 52. For example, in FIG. 2, individual 36 has indicated that he is a smoker who reads English, so that algorithm 44 tailors interview form 46 to include questions written in English relating to a smoking habit. After tailoring interview form 46, questionnaire generator 14 transfers form 46 through network 26 to remote terminal 38, step 206.

Upon receiving interview form 46, individual 36 enters in remote terminal 38 answers to each question and transfers the answers through communication network 26 to profile computer 12. Profile computer 12 receives the answers, step 208, and profile generator 16 generates from the received answers motivational driver profile 94, comprehension capacity profile 96, and media selection profile 98, step 210.

To generate motivational driver profile 94, profile generator 16 examines the answers to each question in category 60 of interview form 46, as shown in FIG. 3. For each of the six subsets of questions 62, 64, 66, 68, 70, and 72, profile generator 16 scores the answers given by individual 36 and adds the individual scores into a total score expressing the value placed by individual 36 on each motivating factor for modifying his or her behavior.

For example, in one possible embodiment, the total score for each motivating factor is constrained to be a number between 1 and 10 with 10 indicating the highest value placed on the motivating factor and 1 indicating the lowest value placed on the motivating factor. In this embodiment, profile generator 16 scores the answers received for each of the six subsets of questions in category 60 and calculates six numbers between 1 and 10 that numerically indicate the value placed by individual 36 on longevity, quality of life, family life, social acceptability, social responsibility, and economy. Of course, other scoring methods are possible in alternative embodiments. Specific techniques for scoring questionnaires in this manner are well known in the art.

Similarly, profile generator 16 calculates numeric values from the answers received for category 74, comprehension capacity questions, and category 84, media preference questions, to create comprehension capacity profile 96 and media selection profile 98, respectively. Profiles 94, 96, and 98 are then transferred to individual 36 at remote terminal 38 in confirmation form 110, as shown in FIG. 4. Individual 36 accepts or rejects each of profiles 94, 96, and 98 and transfers the completed confirmation form 110 to profile computer 12 such that form 110 is received by profile generator 16. Profile generator 16 reads completed confirmation form 110 to determine if each of profiles 94, 96, and 98 have been confirmed by individual 36, decision step 212.

If each of profiles 94, 96, and 98 are confirmed, they are then stored in profile record 100 of profile database 20, step 214. If any of profiles 94, 96, and 98 are rejected, system 10 returns to step 204, tailoring interview form 46 to repeat the interviewing process described above. Of course, if not all the profiles were rejected, profile generator 16 will only transfer the categories of interview form 46 relevant to the rejected profiles.

Next, in step 216, translator 18 receives through network 26 clinical data relating to health condition 52 of individual 36. To receive medical claims data 102, translator 18 accesses medical claims database 34 through network 26 and queries database 34 with name 50 of individual 36. Similarly, to receive electronic medical records 104, translator 18 accesses medical records database 30 through network 26 and queries database 30 with name 50 of individual 36. Device measurements 106 are transferred from monitoring device 40 to terminal 38 and through network 26 so that they are received by translator 18. This completes the final step shown in FIG. 7. The flow chart of FIG. 7 continues in FIG. 8.

Referring to FIG. 8, individual 36 next starts an interactive, on-line education session with system 10, step 218. At the start of the session, translator 18 translates the received clinical data and profiles 94, 96, and 98 into profile code 114 of individual 36, step 220. To produce profile code 114, translator 18 first processes the received clinical data to determine the current clinical status of individual 36. For example, if individual 36 is a diabetic and monitoring device 40 is a blood glucose meter, then device measurements 106 will indicate the current blood glucose levels of individual 36 and medical claims data 102 and medical records 104 will indicate in which specific aspects of diabetes related behavior individual 36 needs improvement. Translator 18 narrows the selection of profile code 114 to those profile codes corresponding to the determined clinical status of individual 36.

Next translator 18 determines which one of the profile codes corresponding to the determined clinical status of individual 36 best matches his or her motivational drivers, comprehension capacity, and preferred media as recorded in profiles 94, 96, and 98, respectively. Once translator 18 selects the best match, profile code 114 is stored in profile database 20 and sent to educational fulfillment bank 22.

Matching program 116 then matches profile code 114 to index code 118 of piece of educational material 120, step 222. Matching program 116 further determines if educational fulfillment bank 22 requires external source 31 for additional educational material relevant to profile code 114, decision step 224. If matching program 116 determines that additional educational material is required, educational fulfillment bank 22 accesses external source 31, step 226, and transfers the additional educational material from source 31 to terminal 38. If matching program 116 determines that additional educational material is not required, educational fulfillment bank 22 proceeds directly to step 228, transferring educational material 120 through network 26 to remote terminal 38.

Upon receiving educational material 120 at remote terminal 38, individual 36 begins an interactive learning process monitored by educational performance evaluator 122. As shown in FIG. 6, individual 36 is prompted to enter in terminal 38 educational responses 124 to educational material 120. For example, if individual 36 indicated in interview form 46 that he or she prefers educational video games, educational material 120 will be an educational video game requiring individual 36 to enter responses 124. In another example, individual 36 may prefer text documents, so that educational material 120 is an interactive text document with prompts individual 36 to provide educational responses 124.

Educational performance evaluator 122 receives educational responses 124 through network 26. Evaluation algorithm 126 then evaluates educational responses 124 to determine an educational performance of individual 36, step 230.

Evaluation algorithm further generates profile updates 128 derived from educational responses 124. For example, if educational responses 124 indicate that individual 36 does not understand educational material 120, profile updates 128 will be updates amending comprehension capacity profile 96. Profile generator 16 receives profile updates 128 from evaluator 122 and adjusts profiles 94, 96, and 98 in accordance with profile updates 128, step 232.

Next, system 10 determines if individual 36 has requested an end to the interactive educational session, decision step 234. If individual 36 has not requested an end, system 10 returns to step 220, generating profile code 114 based on adjusted profiles 94, 96, and 98. If individual 36 does request an end to the session, adjusted profiles 94, 96, and 98 are stored in profile database 20 for a subsequent educational session and the current session ends, step 236.

Before the start of the subsequent education session, translator 18 receives updated clinical data through network 26 to determine if individual 36 has made an improvement in his or her health-related behavior. Based on the updated clinical data and adjusted profiles 94, 96, and 98, translator 18 generates a new profile code for targeting educational material to individual 36. In this manner, system 10 provides on-going adjustment to the educational material targeted to individual 36 based on the individual's performance in modifying his or her behavior.

SUMMARY, RAMIFICATIONS, AND SCOPE

Although the above description contains many specificities, these should not be construed as limitations on the scope of the invention but merely as illustrations of the presently preferred embodiment. Many other embodiments of the invention are possible.

For example, the questionnaire generator, profile generator, translator, and profile database need not be centrally located on one profile computer. In an alternative embodiment, the questionnaire generator, profile generator, translator, and profile database may be located on separate computers that are networked together. Further, the educational fulfillment bank need not be located at the same site and share the same network connection with the profile computer. The system and method would be equally effective if the educational fulfillment bank were networked to the profile computer through the communication network.

Further, the system and method described in the preferred embodiment focus on an individual who is a smoker or a diabetic. These health conditions are for illustrative purposes only. The system and method of the invention are equally effective for customizing health education to induce behavior modification in individuals suffering from asthma, high blood pressure, alcohol or drug abuse, or any other health-related condition.

Therefore, the scope of the invention should be determined, not by examples given, but by the appended claims and their legal equivalents.

We claim:

1. An automated system for providing customized health education to an individual at a remote terminal to induce a modification in a health-related behavior of the individual, the remote terminal being connected to the automated system via a communication network, the automated system comprising:

a) a questionnaire generating means for generating an interview form and for transferring the interview form through the communication network to the remote terminal, the interview form containing questions for determining a motivational driver of the individual and a comprehension capacity of the individual, wherein the questions for determining the motivational driver of the individual comprise a subset of questions for determining a value placed by the individual on at least one motivating factor selected from the group consisting of longevity, quality of life, family life, social acceptability, social responsibility, and economy;

b) a profile generating means for receiving through the communication network questionnaire answers entered by the individual from the remote terminal and for generating from the questionnaire answers a motivational driver profile and a comprehension capacity profile of the individual;

c) a translating means connected to the profile generating means and the communication network for receiving through the communication network data relating to a current health condition of the individual and for translating the data, the motivational driver profile, and the comprehension capacity profile into a profile code of the individual; and d) an educational fulfillment means connected to the translating means and the communication network for storing pieces of education material for inducing the modification of the health-related behavior, each piece of educational material having an index code, and for transferring through the communication network to the remote terminal at least one piece of educational material having an index code matching the profile code of the individual.

2. The system of claim 1, wherein the questionnaire generating means further comprises:

a) a registration means for registering a name of the individual, a language of the individual, and the current health condition of the individual; and b) a tailoring means for tailoring the interview form in dependence upon the language and the current health condition of the individual.

3. The system of claim 1, further comprising an evaluation means connected to the profile generating means for evaluating educational responses of the individual to the educational material and for providing to the profile generating means profile updates derived from the educational responses.

4. The system of claim 1, wherein the profile generating means further includes a confirmation means for confirming with the individual the generated motivational driver profile and the generated comprehension capacity profile.

5. The system of claim 1, wherein the questions for determining the comprehension capacity of the individual comprise a subset of questions to determine at least one comprehension capacity factor of the individual selected from the group consisting of age, language skills, reading habits, and educational background.

6. The system of claim 1, wherein the interview form further contains a media preference question for determining a media preference of the individual, the profile generating means further includes means for generating a media selection profile, and the translating means further includes means for translating the media selection profile into the profile code of the individual.

7. The system of claim 1, wherein the educational fulfillment means further comprises means for accessing an external source of additional educational materials and means for transferring the additional educational materials from the external source to the remote terminal.

8. The system of claim 1, wherein the data relating to the current health condition of the individual comprises measurements of a physical characteristic of the current health condition and wherein the measurements are received from a monitoring device connected to the remote terminal.

9. The system of claim 1, wherein the data related to the current health condition of the individual comprises medical claims received from a managed care organization of the individual.

10. The system of claim 1, wherein the data related to the current health condition of the individual comprises electronic medical records received from a health-care provider of the individual.

11. A method for providing customized health education to an individual to induce a modification in a health-related behavior of the individual, the individual having access to a remote terminal connected to an automated education system via a communication network, the method comprising the following steps:

a) storing in the automated education system pieces of education material for inducing the modification of the health-related behavior, each piece of educational material having an index code;

b) transferring from the automated education system to the remote terminal an interview form containing questions for determining a motivational driver of the individual and a comprehension capacity of the individual, wherein the questions for determining the motivational driver of the individual comprise a subset of questions to determine a value placed by the individual on at least one motivating factor selected from the group consisting of longevity, quality of life, family life, social acceptability, social responsibility, and economy;

c) receiving in the automated education system questionnaire answers entered by the individual from the remote terminal;

d) generating from the questionnaire answers a motivational driver profile and a comprehension capacity profile of the individual;

e) further receiving in the automated education system data relating to a current health condition of the individual;

f) translating the data, the motivational driver profile, and the comprehension capacity profile into a profile code of the individual; and g) matching the profile code of the individual to a matching index code of at least one piece of educational material stored in the automated system; and h) transferring the at least one piece of educational material through the communication network to the remote terminal.

12. The method of claim 11, further comprising the steps of:

a) registering a name of the individual, a language of the individual, and the current health condition of the individual in the automated education system prior to transferring the interview form; and b) tailoring the interview form to the individual in dependence upon the language and the current health condition of the individual.

13. The method of claim 11, further comprising the steps of evaluating educational responses of the individual and adjusting the motivational driver profile and the comprehension capacity profile in dependence upon the educational responses.

14. The method of claim 11, further comprising the steps of:

a) transmitting the generated motivational driver profile and the generated comprehension capacity profile from the automated education system to the remote terminal; and b) receiving from the remote terminal a confirmation of the motivational driver profile and the comprehension capacity profile.

15. The method of claim 11, wherein the questions for determining the comprehension capacity of the individual comprise a subset of questions to determine at least one comprehension capacity factor of the individual selected from the group consisting of age, language skills, reading habits, and educational background.

16. The method of claim 11, wherein the interview form further contains media preference questions for determining a media preference of the individual and wherein the translating step further comprises translating the media preference into the profile code of the individual.

17. The method of claim 11, further comprising the steps of accessing an external source of additional educational materials and transferring the additional educational materials from the external source to the remote terminal.

18. The method of claim 11, wherein the data relating to the current health condition of the individual comprises measurements of a physical characteristic of the health condition and wherein the measurements are received by the automated education system from a monitoring device connected to the remote terminal.

19. The method of claim 11, wherein the data relating to the current health condition of the individual comprises medical claims received from a managed care organization of the individual.

20. The method of claim 11, wherein the data relating to the current health condition of the individual comprises electronic medical records received from a health-care provider of the individual.

* * * * *

(12) EX PARTE REEXAMINATION CERTIFICATE (7164th)
United States Patent
Brown et al.

(10) Number: US 5,879,163 C1
(45) Certificate Issued: Nov. 17, 2009

(54) ON-LINE HEALTH EDUCATION AND FEEDBACK SYSTEM USING MOTIVATIONAL DRIVER PROFILE CODING AND AUTOMATED CONTENT FULFILLMENT

(75) Inventors: Stephen J. Brown, Mountain View, CA (US); Erik K. Jensen, Stockton, NJ (US)

(73) Assignee: Health Hero Network, Inc., Mountain View, CA (US)

Reexamination Request:
No. 90/009,238, Aug. 1, 2008

Reexamination Certificate for:
| | |
|---|---|
| Patent No.: | 5,879,163 |
| Issued: | Mar. 9, 1999 |
| Appl. No.: | 08/669,613 |
| Filed: | Jun. 24, 1996 |

(51) Int. Cl.
| | |
|---|---|
| G09B 19/00 | (2006.01) |
| G09B 23/28 | (2006.01) |
| G09B 7/00 | (2006.01) |

(52) U.S. Cl. .................. 434/236; 434/262; 434/323; 434/362

(58) Field of Classification Search .................. None
See application file for complete search history.

(56) References Cited

U.S. PATENT DOCUMENTS 4,428,733 A 1/1984 Kumar-Misir 5,359,509 A 10/1994 Little et al.
5,722,418 A 3/1998 Bro
5,879,163 A 3/1999 Brown et al.

OTHER PUBLICATIONS

Williams, Geoffrey C., et al., "Motivational Predictors of Weight Loss and Weight–Loss Maintenance", Journal of Personality and Social Psychology, vol. 70, No. 1, 115–126, 1996.

*Primary Examiner*—Beverly M. Flanagan

(57) ABSTRACT

An automated system and method provides customized health education to an individual at a remote terminal to induce a modification in a health-related behavior of the individual. The automated system includes a questionnaire generator for questioning the individual to determine his or her motivational drivers and comprehension capacity. A profile generator receives answers entered by the individual from the remote terminal and generates a motivational driver profile and a comprehension capacity profile of the individual. A translator receives clinical data relating to a current health condition of the individual and translates the clinical data, the motivational driver profile, and the comprehension capacity profile into a profile code. An educational fulfillment bank matches the profile code to matching educational materials and transfers the matched educational materials to the remote terminal. An evaluation program evaluates educational responses of the individual and provides profile updates for targeting subsequent educational material to the individual based on the educational responses.

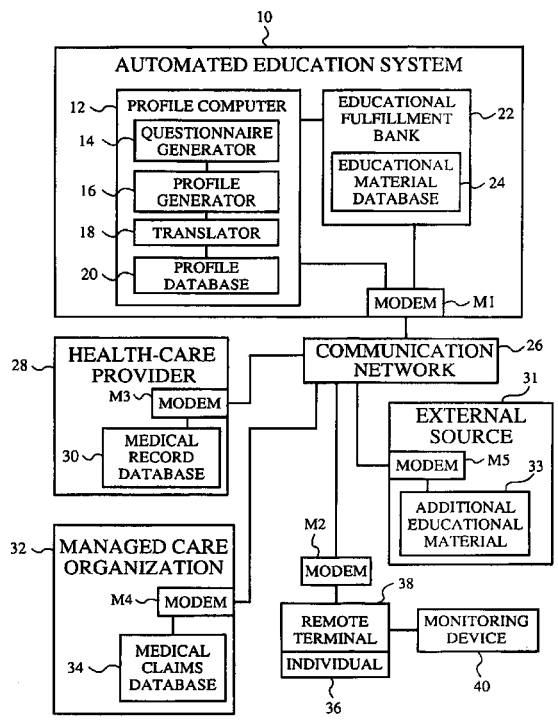

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *